United States Patent
Meugniot

(10) Patent No.: US 6,568,442 B1
(45) Date of Patent: May 27, 2003

(54) ROUTER BIT FOR FLOORBOARD

(76) Inventor: Joseph Anthony Meugniot, 10939 Yolanda Ave., Northridge, CA (US) 91326

( * ) Notice: Subject to any disclaimer, the term of this patent is extended or adjusted under 35 U.S.C. 154(b) by 0 days.

(21) Appl. No.: 09/995,429

(22) Filed: Nov. 28, 2001

(51) Int. Cl.[7] .............................. B27M 1/00; B27C 1/00; B27G 1/00
(52) U.S. Cl. ................. 144/371; 144/134.1; 144/135.2; 144/218; 144/240; 144/137; 144/363; 407/54; 407/56
(58) Field of Search ............................... 144/134.1, 2.1, 144/136.1, 137, 218, 240, 241, 363, 371, 213, 135.2; 409/90, 121, 124, 181, 182, 234, 232; 407/31, 32, 33, 34, 62, 54, 53, 56, 57

(56) References Cited

U.S. PATENT DOCUMENTS

| | | | |
|---|---|---|---|
| 1,278,702 A | | 9/1918 | Mallernee |
| 1,359,765 A | * | 11/1920 | Stelmach ..................... 144/240 |
| 2,828,787 A | * | 4/1958 | Boggs ......................... 144/218 |
| 2,911,019 A | | 11/1959 | Bailey, Jr. et al. |
| D273,390 S | | 4/1984 | Lassiter |
| 4,640,324 A | | 2/1987 | Lounds |
| 4,865,093 A | * | 9/1989 | Ford et al. .................. 144/240 |
| 5,040,581 A | | 8/1991 | Takashima |
| 5,116,166 A | | 5/1992 | Rinas |
| 5,249,614 A | | 10/1993 | Osborn |
| 5,409,299 A | | 4/1995 | Holder |
| 5,597,269 A | | 1/1997 | Ogawa |
| 5,697,413 A | | 12/1997 | Fuller |
| 5,899,252 A | * | 5/1999 | Pozzo ......................... 144/228 |
| 5,996,659 A | * | 12/1999 | Burgess ...................... 144/218 |
| 6,206,062 B1 | | 3/2001 | Motzer |
| 6,367,524 B1 | * | 4/2002 | Brewer ........................ 144/218 |

FOREIGN PATENT DOCUMENTS

| | | | | |
|---|---|---|---|---|
| DK | 27338 | * | 3/1921 | ................. 144/240 |
| GB | 11369 | * | 3/1920 | ................. 144/240 |

* cited by examiner

*Primary Examiner*—W. Donald Bray
(74) *Attorney, Agent, or Firm*—Colin P. Abrahams

(57) ABSTRACT

The invention is for a method for removing at least a portion of a floorboard from a plurality of floorboards installed on a surface base. The method comprises isolating the floorboard or portion thereof for removal and removing a central portion of the isolated floorboard so as to leave a pair of elongate lateral strips, a pair of end portions and a substantially central open space. A routing bit having a shaft and a blade portion is then located such that the blade portion is parallel to, and cuts in, the same plane as the surface base on which the floorboard is installed. The blade is placed beneath the lateral strips and/or end portions so as to remove all material between a lower surface of the floorboard and the base upon which it is installed. The invention is also for a routing bit for removing a floorboard from the base upon which it is mounted.

14 Claims, 2 Drawing Sheets

ROUTER BIT FOR FLOORBOARD

FIELD AND BACKGROUND OF THE INVENTION

This invention relates to an apparatus and method for removing a floorboard from an installed wooden or other type of flooring. In one particular aspect, the invention provides a router bit configured so as to separate a floorboard from the base upon which it is mounted, thereby facilitating removal of the floorboard. The invention is also for a method whereby a floorboard can be removed from its previously installed position.

Wood floors and floorboards are commonly and widely used in residential, commercial and industrial settings. In a typical format, wood floors comprise a plurality of elongate planks which are laid alongside each other so that their edges abut, and wherein a plurality of these planks effectively cover an entire surface. In order that the individual planks are properly located with respect to each other, as well as the base on which they are mounted, a tongue-in-groove configuration is used between adjacent floorboards. In other words, a particular plank will have two long edges, with one of these edges having a projecting tongue, and the opposite edge having a recessed groove, both the tongue and groove running along the entire length of the particular plank. When planks are laid alongside each other during installation, they are fitted together so that the tongue running alongside the edge of one floorboard is received within the groove of an adjacent plank. The tongues and grooves are positioned on each plank such that the long edges of the adjacent planks closely abut one another, and further so that the upper surface of the multiple planks which constitute the floor present a flush effect and appearance. In this way, the complete upper surface defined by the plurality of floorboards is therefore a smooth one.

It often happens that one particular floorboard, or a series of adjacent floorboards or planks, may become damaged by, for example, buckling or bending due to water, or severely scarred due to excessive use, or dented or chipped as a result of the accidental falling of a heavy object thereon. Further, a particular plank or series of planks may become discolored or otherwise tarnished, making it desirable to replace only a section of the flooring, without removing the remaining larger portion.

In installing wooden flooring on a base, which would typically comprise a concrete base, the lower surface of each floorboard is glued to the upper surface of the base. Therefore, a particular plank in a floorboard installation would be securely held in position not only by the tongue-and-groove attachment to its adjacent planks in the flooring, but also due to the strong adhesive effects of a layer of glue between the lower surface of the plank and the base.

The tongue-and-groove interrelationship between adjacent planks in the flooring, as well as the glue adhering the lower surface of the floorboards to the base on which the flooring is mounted, make it extremely difficult and time-consuming to remove a plank or small sections of flooring. It is impossible to simply lift up a single plank, since a plank is attached through the tongue-and-groove to its adjacent planks, and, even so, the glue keeps the plank firmly on the base.

Current methods for removing a particular plank or small section of flooring from a larger portion involve very time-consuming procedures. The particular plank must be carefully chipped away, one small piece at a time, and the operation is a very delicate one since removal can damage the tongue running along the edge of an adjacent floorboard. This is, of course, an undesirable development since it is advantageous to protect and preserve the tongue and the groove so that it can be used to facilitate proper installation of the new planks. Furthermore, such methods may result in surfaces of surrounding planks and/or boards being damaged as the perimeter edge of the repair area is chipped or pried away. Still further, damage to an adjacent board to remain can easily occur as the board to be removed is pried at an angle, or rotated out, thereby applying pressure to the remaining board.

During repair operations, the combination of the glue and the tongue-and-groove configuration of the planks therefore frequently results in damage to planks not intended for removal due to the delicate and fragile nature of the tongue, which makes it easily breakable, especially after it has been installed for considerable periods of time.

U.S. Pat. No. 5,040,581 (Takashima) describes an apparatus for cutting hardwood flooring strips and an adjustable jig guiding a router to cut hardwood flooring strips while they are still attached to the floorboards, so that a portion of the hardwood floor can be replaced. The router in Takashima simply drills out preset areas of floorboard, including running across planks, so that a block can be removed.

U.S. Pat. No. 5,249,614 (Osborne) describes a laid flooring end-jointer, and provides a router for jointing the end of a laid floorboard. The router provides a straight cut, and ensures that a jointing cut of a particular length is made on the end of a selected floorboard.

U.S. Pat. No. 5,116,166 (Ranas) describes a 45° miter undercutter bit for making a 45° angled miter, while U.S. Pat. No. 5,597,269 (Ogawa) teaches a cutting tool for a honeycomb core, and including a plurality of spiral blades formed of a cylindrical body. U.S. Pat. No. 6,206,062 (Motzer) describes a shank type cutter of a hard material, having a shaft for mounting in a chuck, and a head, having cutting areas about the circumference of the head.

U.S. Pat. No. 1,278,702 (Mallernee) describes a floor tool for removing floorboards to install electric wires and the like, while U.S. Pat. No. 2,911,019 (Bailey) shows a cutting tool attachment for drill presses. This allows for interchangeable cutting means for producing molding of various sizes, shapes and designs.

U.S. Pat. No. 5,409,299 (Holder) teaches a cutter attachment for removing floor covering from a surface. Typically, three cutting attachments, each driven by a hydraulic motor, are utilized together to move a floor covering which may be linoleum, tile, grout or the like. The three cutting attachments are arranged in a triangle so that the cutting path of one cutting attachment overlaps the cutting path of the other two. This apparently makes the apparatus capable of adjusting to the contours of the surfaces on which the floor covering is mounted.

U.S. Pat. No. 4,640,324 (Lounds) teaches the use of a router bit positioned through a material and over a sheet of underlying material. This facilitates the use of precise cutting of a sheet of inlay material.

SUMMARY OF THE INVENTION

The present invention is for an apparatus and method for facilitating removal of a particular plank or series of planks within a wooden floor.

The apparatus of the invention is in the form of a specifically designed router bit which is configured so as to fit into one space between the lower surface of the floorboard or plank, and the base upon which the floorboard is mounted. This space is often filled with glue. The router therefore destroys the layer of glue, and thereby makes it considerably easier to simply pull out a piece of floorboard without destroying the tongue-and groove structure of the floorboards which are to remain.

Preferably, the router bit will operate in a drill such as a multi-purpose cutting tool. For optimal results, the router bit of the invention is preferably used with a router. In hardwood repair applications, the router bit will work with any engineered plank floor and will fit almost any router currently available on the market.

The method of the invention provides a series of procedures for removing a specific plank. The method requires that an inside portion of the plank be removed to leave a rectangular or other shaped hole in the floorboard. The only remaining portion of the floorboard to be removed comprises a somewhat thin, peripheral portion. The router bit of the invention is then placed within the hole, and activated so as to destroy the layer of glue between the floorboard/plank and the base upon which it is mounted. Destruction and removal of this glue makes it a simple matter to disengage the remaining portion of the floorboard plank from its adjacent planks.

According to one aspect of the invention, there is provided a routing bit for removing a floorboard from the base upon which it is mounted, the routing bit comprising: an elongate shaft having an axis, the shaft having one end adapted for connection to a tool for rotating the shaft, and an opposing end; and a blade member connected to the opposing end of the shaft, the blade being positioned for cutting in a plane substantially transverse to the axis of the shaft, the blade member comprising a body portion and at least one cutting edge located on the body portion.

Preferably, the routing bit further comprises a spacing member located on the shaft and adjacent the blade member, the spacing member comprising a surface for engaging a portion of the floorboard to space and guide the routing bit. The spacing member may comprise an O-ring mounted on the shaft and rotatable independently with respect to the shaft and the blade member.

The routing bit may further comprise a projection on the blade member, the projection keeping the blade spaced, in use, from the surface on which it is located.

The blade may comprise: two substantially opposing arm members, each arm member having a cutting edge thereon; a substantially circular portion with cutouts so as to define a pair of opposing tooth portions, each tooth portion having a cutting edge thereon; a substantially circular portion with a plurality of tooth portions at the periphery thereof, each tooth portion having a cutting edge; and/or a central portion of circular shape, and a four outwardly projecting arms, each arm being at right angles to adjacent arms, each arm having a cutting edge thereon.

The platform may be of circular shape, triangular shape or some other shape.

According to another aspect of the invention, there is provided a method for removing at least a portion of a floorboard from a plurality of floorboards installed on a surface base, the method comprising: isolating the floorboard or portion thereof for removal; removing a central portion of the isolated floorboard so as to leave a pair of elongate lateral strips, a pair of end portions and a substantially central open space; locating a routing bit having a shaft and a blade portion such that the blade portion is parallel to, and cuts in, the same plane as the surface base on which the floorboard is installed; and placing the blade beneath the lateral strips and end portions so as to remove all material between a lower surface of the floorboard and the base upon which it is installed.

The method may further comprise the step of placing a spacer on the routing bit, the spacer abutting and engaging the isolated floorboard, so as to stabilize the position and operation of the routing bit. Preferably, the blade is slightly elevated off the surface base by means of a projecting platform on the blade.

DETAILED DESCRIPTION OF THE INVENTION

Figure 1:
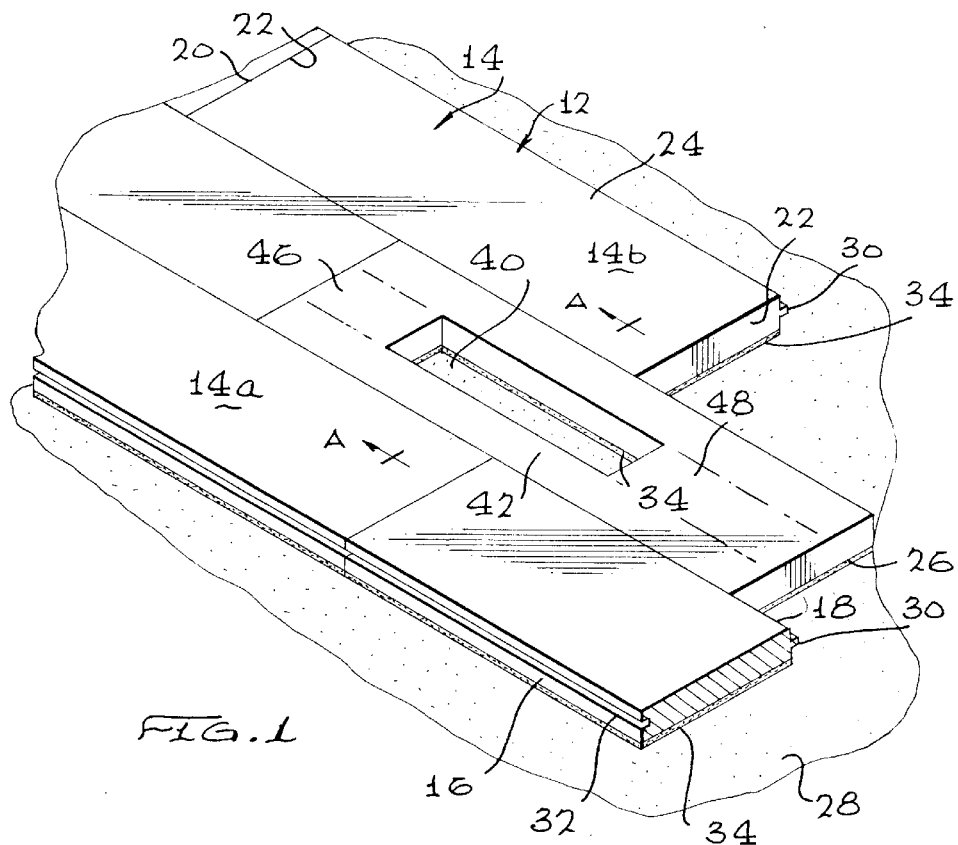
FIG. 1 is a perspective view of a portion of wooden flooring, showing a plank to be removed in accordance with the method and apparatus of the invention.

The invention provides an efficient apparatus and method for removing one or more planks from a laid floor. The invention allows for the clean removal of planks, without destroying the tongue-in-groove connection between adjacent planks. Reference is made to FIG. 1 of the drawings, which shows a portion of flooring 12, the flooring 12 being comprised of a plurality of individual planks 14a, 14b, 14c etc. Each plank 14 has a pair of substantially parallel elongate longitudinal edges 16 and 18, and a pair of short opposing substantially parallel end edges 20 and 22. Further, each plank 14 has an upper surface 24 and a lower surface 26.

According to conventional methods of laying the planks on a base 28, which usually comprises a flat concrete surface, the planks 14 are laid in a line, short edge to short edge, with the upper end edge 20 of one plank 14 abutting the lower end edge 22 of an adjacent plank 14. The upper and lower end edges 20 and 22 will conventionally have smooth, planar surfaces at substantially right angles to the plane of the upper surface 24. Thus, the upper and lower end edges 20 and 22 of adjacent planks 14 will abut right up against each other without any significant space therebetween.

The longitudinal edge 18 of each plank 14 has a tongue 30 extending outwardly therefrom, and the opposite longitudinal edge 16 of each plank 14 has a groove 32 extending along its entire length. In laying flooring 12 on a base 28, the tongue 30 of one plank is received within the groove 32 of its laterally adjacent plank or planks 14. This tongue-in-groove configuration between adjacent planks serves a number of important functions. First, it provides an easy method of locating a plank 14 with respect to its adjacent planks 14. More importantly, however, it ensures proper orientation of adjacent planks relative to other so that the upper surface 24 of one plank 14 is substantially flush with the upper surface 24 of its adjacent planks. In this way, the multitude of planks 14 which constitute the flooring 12 together define the smooth flat surface with no ridges, grooves or stepped portions affecting the appearance and function of the flooring 12.

In order to secure the planks 14 to the base 28, a layer of glue 34 is placed on the base 28, so that when the glue dries, the lower surface 26 of each plank 14 will be firmly adhered to the base 28. This helps to prevent buckling of the floorboard, avoids the creation of air pockets, and ensures a fast and secure connection of the flooring 12 to the base 28.

From time to time, it may be necessary to remove one plank 14, or a group of planks 14, which may have become damaged, buckled or otherwise defective. It is extremely difficult to remove individual planks, as will be discussed below, and one of the reasons for this situation is the use of the layer of glue 34 between the planks 14 and the base 28. The existence of this layer of glue 34 makes it very difficult to remove planks without severely damaging the tongue 30 and/or groove 32 of each plank. To avoid such damage, each plank must be carefully chiseled to separate and detach the glue from the lower surface 26 and the base 28, otherwise the existing planks 14 which are to remain, become damaged. The damage of the tongue 30 or groove 32 will, of course, impact the fit and finish of the newly installed planks 14, and may affect the smoothness of the upper surface 24.

Figure 2:
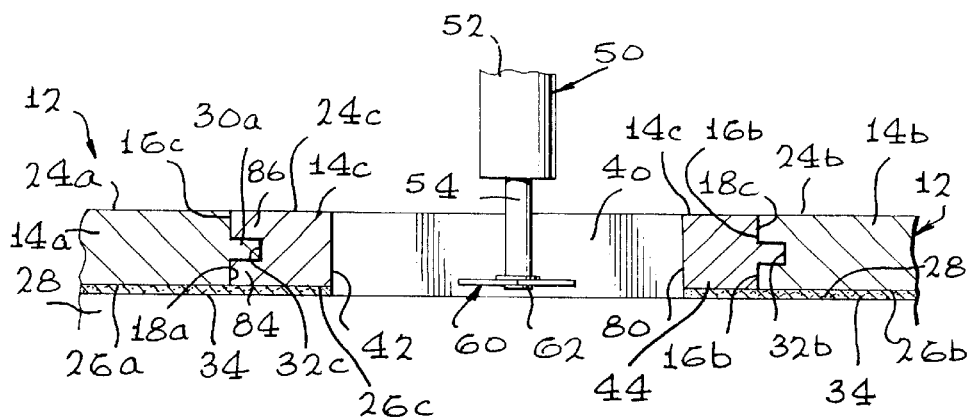
FIG. 2 is a cross-section through line A—A in FIG. 1 showing the floorboard to be removed, as well as the router bit and its action.
Figure 3:
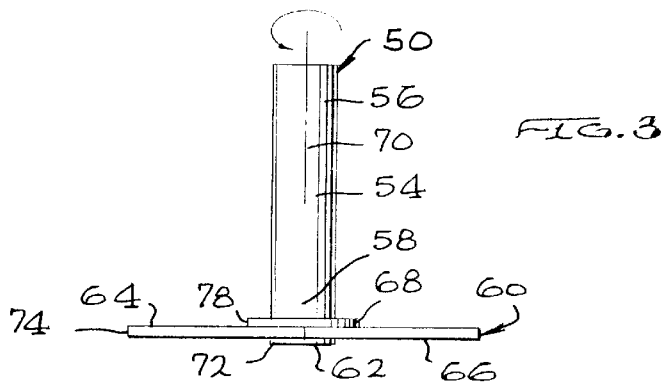
FIG. 3 is a side-view of a router bit in accordance with the present invention.

Reference is now made to FIG. 2 of the drawings. In FIG. 2, which is a cross-section through line A—A of FIG. 1, there is shown a base 28 or substrate upon which the flooring 12 is installed, the flooring 12 consisting of a first plank 14a, a second plank 14b, and a third plank 14c located between planks 14a and 14b. In the configuration shown in FIG. 2, the plank 14c, which is damaged, discolored or buckled and to be removed for some reason, is located between two laterally adjacent planks 14a and 14b. The plank 14a has a longitudinal edge 18a and a tongue 30a extending laterally outward therefrom. The plank 14a further has a smooth upper surface 24a, and a lower surface 26a which is applied to the base 28 by means of a layer of glue 34.

The plank 14b comprises a longitudinal edge 16b having a groove 32b formed therein. The plank 14b further comprises an upper surface 24b, a lower surface. 26b, the lower surface 26b being attached to the base 28 by a layer of glue 34.

Reference is now made to the plank 14c, which is the plank designated for removal from the flooring 12. The plank 14c has an upper surface 24c, a lower surface 26c, the lower surface 26c being attached to the base 28 by the layer of glue 34. The plank 14c further comprises a longitudinal edge 16c, which has a groove 32c therein. The plank 14c has at its opposite side a longitudinal edge 18c, and a tongue 30c extending along the entire longitudinal edge 18c.

In the drawings shown in FIGS. 1 and 2, the single plank 14c is designated for removal. However, multiple planks or portions thereof may be removed at any one time, and the principles and methods for removal thereof will in all cases be substantially identical.

As mentioned above, one of the critical procedures involved in removing a plank or plurality of planks from a flooring, is to ensure that the planks that remain, and especially the tongue-and-groove joints thereof, are not compromised. The method and apparatus of the invention provides a quick and effective way to achieve both of these objectives.

In order to initiate the removal of plank 14c, the central portion thereof is removed to create a rectangular space 40. This is shown in FIGS. 1 and 2 of the drawings. Once the central portion of the plank 14c has been removed to create the space 40, the remaining portions of the plank 14c comprise a first lateral peripheral strip 42, a second lateral peripheral strip 44, a first end peripheral portion 46 and a second end peripheral portion 48. In removing the central portion of the plank 14c to create the space 40, no special care or precautions need be taken, and the floorboard, as well as the layer of glue can simply be appropriately sawed and/or chiseled, using a circular or other machine saw to remove the central portion.

Removal of the remaining lateral strips 42 and 44, and the end portions 46 and 48 is, however, a substantially more delicate operation, since, where at all possible, the tongue-and-groove of the remaining planks should be preserved for use, so as to achieve an improved installation of the new replacement plank(s) in relation to the remaining planks.

As mentioned, a significant obstacle to the removal of the strips 42 and 44, and end portions 46 and 48, is the existence of the layer of glue 34 between the lower surface 26 of each plank and the base 28. The present invention therefore incorporates the step of utilizing a router tool, so as to pulverize, destroy and remove the layer of glue 34.

In order to remove the glue layer 34, a routing bit 50, attached to a drill 52 is inserted within the space 40. The routing bit 50 comprises a shaft 54, having a securing end 56 securing the routing bit 50 to a drill 52, and a blade end 58 remote from the securing end 56. A blade 60 is securely mounted at the blade end 58 of the shaft 54. A routing bit platform or projection 62 extends a very short distance beyond the blade 60, and has a function which will described more fully below.

The blade 60 comprises an upper surface 64 and a lower surface 66. Mounted about the shaft 54, and essentially resting on the upper surface 64 of the blade 60, there is located an O-ring 68. While the blade 60 is fixed to the shaft 54 so that when the shaft 54 spins the blade 60 will also spin, the O-ring 68, in contrast, is able to move or rotate freely about the shaft 54, and independently thereof. The O-ring 68 serves to operate as a spacer or guide for using the routing bit 50, as will be described.

The routing bit 50 is inserted within the space 40 of the plank 14c, as indicated in FIG. 2 of the drawings. The securing end 56 of the shaft 54 is connected to a drill or other machine which spins or rotates at high speed the shaft 54 about its axis 70. The routing bit 50 is located within the space 40 such that an end surface 72 of the platform 62 rests upon the flat surface or base 28. With the routing bit 50 rotating at high speed, it is moved over towards the second strip 44, and an edge 74 of the blade 60 eventually penetrates the layer of glue 34, and possibly even a very small section of the lower surface 26c of the second strip 44. The routing bit 50 then continues to move until an outer surface 78 of the O-ring 68 touches the exposed surface 80 of the second strip 44.

It will be appreciated that the dimensions of the blade 60 should be such that the length of the blade from the level of the outer surface 78 of the O-ring 68 to the blade edge 74 should be close to, or equal to, the width of the first and second strips 42 and 44. In this way, all of the glue under those strips would effectively be removed by the blade 60.

With the routing bit 50 positioned such that the outer surface 78 of the O-ring 68 abuts against the exposed surface 80, the routing bit 50 can then be moved up and down along the length of the second strip 44 so as to destroy the layer of glue 34 under the second strip 44. The routing bit 50 is then moved around the space 40 to thereafter destroy the layer of glue 34 under the first strip 42, as well as each of the first and second end portions 46 and 48. Once this has been done, the layer of adhesive glue 34, which is one of the most significant obstacles to the clean and effective removal of the plank 14c, has been destroyed. At this time, there is therefore no glue layer or other component which is keeping the plank 14c fastened to the base 28.

The next step in the procedure for the removal of the plank 14c would be to remove each of the first and second end portions 46 and 48, and this can be accomplished by sawing a separation line from the space 40, to continue along the line of each of the first and second strips 42 and 44, until such time as a cut has been made extending through the first and second end portions 46 and 48, to reach the end edges 20 and 22 respectively. At this point, each of the first and second end portions 46 and 48 can simply be removed by lifting them up off the base 28.

Thereafter, the first and second strips 42 and 44 can be removed by sliding them away from the longitudinal edge at which they are connected to adjacent planks. In this way, each of the first and second strips 42 and 44 will disconnect from the adjacent planks by separation of the tongue-and-groove joint. At this point, as well, each of the strips 42 and 44 can simply be lifted up out of the space 40 created by removal of the central portion of the plank, and each of the peripheral end portions 46 and 48 respectively.

The removal of these end portions 46 and 48, and the first and second strips 42 and 44 leaves a clean, undamaged space, with no significant harm caused to the tongue-and-groove joint of the remaining adjacent planks 14a and b, thus making them available for use in the reinstallation of replacement planks.

The routing bit 50 of the invention, and its method of use, thus provides a highly effective and efficient alternative to the labor intensive task of chiseling out the glue layer using a hammer and chisel. The conventionally applied hammer-and-chisel method for separating the lower surface of a plank 14 from the base 28 is extremely time consuming and, even so, does not guarantee the clean and effective separation which can be achieved using the routing bit 50 and method described above.

The remaining planks 14 have the tongues and grooves intact, which can be used for installing a replacement plank. Where multiple replacement planks are to be installed, a tongue-and-groove connection can be effected between all of the replacement planks. Only the one last tongue-and-groove connection need be compromised. The last plank to be installed would have the lower protrusion 84 (best shown in FIG. 2 of the drawings) removed so as not to provide an obstruction to proper insertion of that last plank. However, the upper protrusion 86 could remain intact, and rest on the tongue of the adjacent plank.

An effective removal and reinstallation of planks is therefore made possible.

Figures 4A, 4B, 4C:
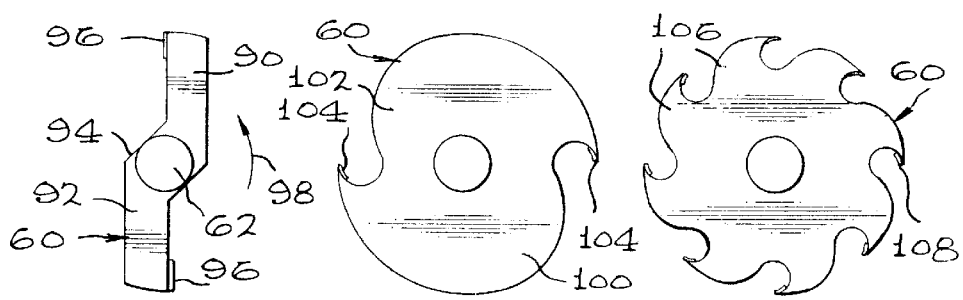
FIGS. 4A to 4F are bottom views of the blade portion of the router bit, showing different configurations thereof.

The routing bit 50 may have a variety of blades 60 which can be of different design, shape or effect, some of which may be preferred in a particular application, but all of which generally achieve the purpose of routing or pulverizing the layer of glue between the lower surface of the plank 14 and the base 28. FIGS. 4A to 4A show examples of different modifications of blade shape and forms. In FIG. 4A, the blade comprises a pair of substantially opposing arms 90 and 92, and central portion 94 which is attached to the shaft 54 of the routing bit 50. FIG. 4A shows the platform 62 extending slightly beyond the blade. The blade 60 in FIG. 4A has appropriately located cutting edges 96. As the arms 90 and 92 rotate at speed in the direction indicated by the arrow 98, the cutting edges 96 penetrate the glue (and possibly a part of the lower surface of plank) to provide a clean-cut separation between the plank and the base 28.

In FIG. 4B, the blade 60 is substantially circular with a pair of opposing cutouts 100 and 102, each having a point and cutting edges 104. FIG. 4C shows a blade 60 having a series of multiple tooth portions 106, each tooth portion having a cutting edge 108.

Figures 4D, 4E, 4F:
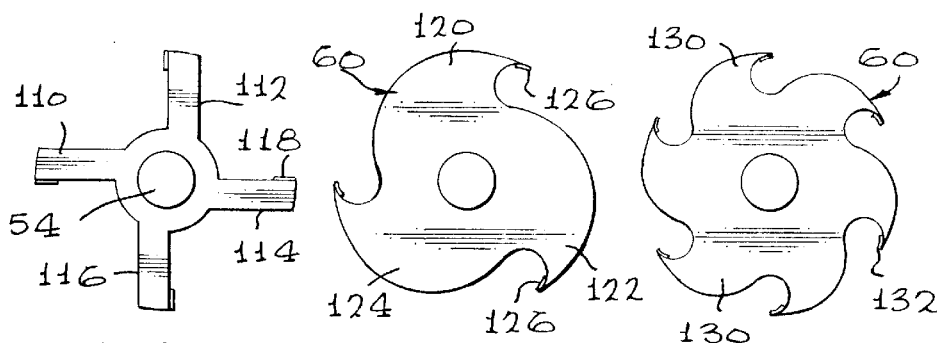

With reference to FIG. 4D, four arms 110, 112, 114 and 116 are provided, with each arm having a cutting edge 118, to cut the glue and wood as the blade spins. FIG. 4E shows yet another possible modification of the blade 60, with three substantially equispaced tooth portions 120, 122 and 124 in a circular shape, with each tooth portion having a cutting edge 126. Finally, FIG. 4F shows yet a further circular shaped blade 60 having six tooth portions 130, arranged so that three tooth portions are located towards each of the ends of the circular shaped blade. A cutting end 132 is formed on each tooth portion 130.

Figures 5A, 5B, 5C:
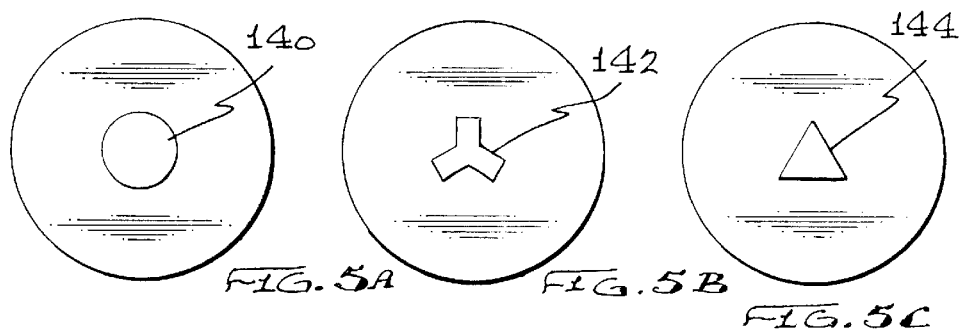
FIGS. 5A to 5C show different configurations of the button portion of the router bit.

With reference to FIG. 5 of the drawings, FIGS. 5A, 5B and 5C show different shaped platforms or projection extending from the shaft 54 of the routing bit 50. FIG. 5A shows a substantially circular platform 140. FIG. 5B shows a three-armed platform 142, while FIG. 5C shows a substantially triangular shaped platform 144. It will, however, be appreciated that the platform may be of any desired shape, which can be modified to operate optimally within a given situation.

An important function of the platform 62, or the modifications in shape thereof shown in FIG. 5 of the drawings, is to slightly elevate the routing bit 50 off the base 28, so that the blade 60 will not be in contact with the base 28. The effect of this platform 62 can be seen in FIG. 2 of the drawings. With a significantly smaller surface area in contact with the base, and the blade 60 slightly elevated so as not to be in contact with the base 28, its operation will be more effective, and it will have a longer life due to less wear-and-tear which may result from continuous or periodic contact with the hard concrete base 28.

The O-ring 68, while optional, when located about the shaft 54, significantly helps to optimize use of the routing bit 50. Since the O-ring 68 is capable of independent rotatory movement about the shaft 54, it can serve as a guide so that the router can be properly located and spaced with respect to the plank of wood to ensure a consistent cut by the blade 60 to effectively remove the glue layer 34. However, variations of the O-ring, and even the omission thereof, fall within the scope of the invention, since the routing bit 50 would still operate to function in a manner for removing the glue 34, as described above.

Variations of the invention can be made. For example, any shaped blade may be used which will operate to effect removal of the glue. The circumference or reach of the blade may vary according to need, and may vary between for example, 2 inches and 4 inches in diameter. The cutting edges described may be carbide-tipped, and may comprise specially adhered attachment to the blade or blade arms, or indeed be integral with the blade.

What is claimed is:

1. A routing bit for removing a floorboard from the base upon which it is mounted, the routing bit comprising:
    an elongate shaft having an axis, the shaft having one end adapted for connection to a tool for rotating the shaft, and an opposing end;
    a blade member comprising a body portion having a first surface and a second surface substantially obverse to the first surface and at least one cutting edge located on the body portion, the blade member being connected to the opposing end of the shaft at its first surface, the blade member being positioned for cutting in a plane substantially transverse to the axis of the shaft; and a projection formed on the second surface and extending outwardly therefrom, the projection keeping the blade member spaced, in use, from a working surface on which it is located.

2. A routing bit as claimed in claim 1 further comprising a spacing member located on the shaft and adjacent the blade member, the spacing member comprising a surface for engaging a portion of the floorboard to space and guide the routing bit.

3. A routing bit as claimed in claim 2 wherein the spacing member comprises an O-ring mounted on the shaft and rotatable independently with respect to the shaft and the blade member.

4. A routing bit as claimed in claim 1 wherein the projection on the blade member is substantially disc shaped and is co-axial with the axis of the shaft.

5. A routing bit as claimed in claim 1 wherein the blade member comprises two substantially opposing arm members, each arm member having a cutting edge thereon.

6. A routing bit as claimed in claim 1 wherein the blade member is substantially circular with cutouts so as to define a pair of opposing tooth portions, each tooth portion having a cutting edge thereon.

7. A routing bit as claimed in claim 1 wherein the blade member is substantially circular and has a plurality of tooth portions at the periphery thereof, each tooth portion having a cutting edge.

8. A routing bit as claimed in claim 1 wherein the blade member comprises a central portion of circular shape, and a four outwardly projecting arms, each arm being at right angles to adjacent arms, each arm having a cutting edge thereon.

9. A routing bit as claimed in claim 1 wherein the projection is of circular shape.

10. A routing bit as claimed in claim 1 wherein the projection is of triangular shape.

11. A method for removing at least a portion of a floorboard from a plurality of floorboards installed on a surface base, the method comprising:

isolating the floorboard or portion thereof for removal;

removing a central portion of the isolated floorboard so as to leave a pair of elongate lateral strips, a pair of end portions and a substantially central open space;

locating a routing bit having a shaft and a blade portion such that the blade portion is parallel to, and cuts in, the same plane as the surface base on which the floorboard is installed;

placing the blade beneath the lateral strips so as to remove all material between a lower surface of the floorboard and the base upon which it is installed.

12. A method as claimed in claim 11 further comprising the step of placing a spacer on the routing bit, the spacer abutting and engaging the isolated floorboard, so as to stabilize the position and operation of the routing bit.

13. A method as claimed in claim 11 further comprising the step of slightly elevating the blade off the surface base by means of a projecting platform on the blade.

14. A method as claimed in claim 11 further comprising shaping and formatting the blade according to the nature and shape of the floorboard.

* * * * *